United States Patent [19]

Schneider, Rudolf et al.

[11] Patent Number: 4,718,523
[45] Date of Patent: Jan. 12, 1988

[54] MAGNET BODY FOR ENGINE BRAKES

[75] Inventors: Schneider, Rudolf, Meckenbeuren; Siegfried Winkelmann, Tettnang, both of Fed. Rep. of Germany

[73] Assignee: Zahnradfabrik Friedrichshafen AG, Friedrichshafen, Fed. Rep. of Germany

[21] Appl. No.: 931,749

[22] PCT Filed: Feb. 13, 1986

[86] PCT No.: PCT/DE86/00051
§ 371 Date: Oct. 17, 1986
§ 102(e) Date: Oct. 17, 1986

[87] PCT Pub. No.: WO86/05027
PCT Pub. Date: Aug. 28, 1986

[30] Foreign Application Priority Data

Feb. 20, 1985 [WO] PCT Int'l Appn. .................. PCT/EP85/00055

[51] Int. Cl.⁴ .................. F16D 59/02; H01F 7/16; H02K 7/102
[52] U.S. Cl. .................. 188/161; 188/72.1; 188/163
[58] Field of Search .................. 188/158–165, 188/72.1, 72.3; 310/66, 77; 192/84 A

[56] References Cited

U.S. PATENT DOCUMENTS

| 3,198,293 | 8/1965 | Mathews | 188/163 |
| 3,465,862 | 9/1969 | Birdsall | 188/163 X |
| 3,730,317 | 5/1973 | Jaeschke | 188/163 X |
| 3,734,245 | 5/1973 | Hubbard | 188/163 |
| 4,033,438 | 7/1977 | Wiltsey | 188/163 X |
| 4,228,874 | 10/1980 | Brinkmann et al. | 188/163 X |
| 4,235,311 | 11/1980 | Brinkmann et al. | 188/163 X |

FOREIGN PATENT DOCUMENTS

| 966539 | 8/1975 | Fed. Rep. of Germany . |
| 517084 | 4/1921 | France . |
| 1399381 | 4/1965 | France . |
| 1511762 | 2/1968 | France . |
| 2432117 | 2/1980 | France . |

OTHER PUBLICATIONS

Lenze Extertal Literature printed in Germany by Lemhoefer, Hameln/HLE 14.438/9.79/6 5 4 3 2.

Primary Examiner—Douglas C. Butler
Attorney, Agent, or Firm—Hayes, Davis & Soloway

[57] ABSTRACT

The magnet body (11, 12, 13, 17) is composed of the winding (13) with U-shaped arrangement of separate parts, wherein specially the side leg portions (11, 12) are radially held together by a plastic shell (14) that also insulates the winding (13) and which grips into the spaces of the arrangement of side leg portions (11, 12) with projections (15), which are axially penetrated by spacer sleeves (8) or bolts (9) and eventually also individual pressure springs (18). The expenses of molding and fine processing for the conventional magnet are spared or greatly reduced and the assembly is also simplified in different respects.

9 Claims, 2 Drawing Figures

MAGNET BODY FOR ENGINE BRAKES

The invention concerns magnet bodies and is based on the conventional magnet bodies with excited coils of direct current situated on the second shaft end of engines and similar drives, etc., which magnet bodies are directly secured to the engine flange with a spacer, and adjusting pieces, and with bolts. Those magnet bodies have, for instance, the assembly instruction sheet 3/83 of K. E. Brinkmann GmbH, D-4924 Barntrup or H.L.E. 14.438/9.79/65 of H. Lenze KG, D-4923 External.

The hitherto known magnet bodies are made as massive one- or two-piece rotary parts, which have in the half section a U shape opened toward the armature disk, the interior space of which accommodates the excitable coil circularly wound on a plastic support, for instance. Thus, the outer and inner legs of the U shape built axial pole surfaces and the magnetic short circuit takes place via the rear end of the U shape of the magnet body. Between the magnet body and the engine flange, a non-rotationally but axially movably armature disk is provided that covers with an air gap the open side of the U shape, in the currentless state, and against which abut springs firmly supported on the housing on the magnet side so that the armature disk in the currentless state is compressed by spring tension against a friction disk that rotates with the engine shaft. The use of those brakes is not directly confined to attachment to electroengines, and they also can be similarly used on shafts of other drives.

However, in mass production, the prior known design for the magnet bodies still has not proven satisfactory enough in saving expenses and material:

In the first place, the production of the magnet body as a cast or pressed part generally still has to be refinished, which represents an expense factor of considerable importance.

Besides, it was seldom possible, with the usual means, to keep the dimensions of the coil accurate enough in order to ensure reliably correct fastening in the U shaped interior space of the magnet body, without further assembly aids or securing devices.

The placing of many loose spacer pieces, to be inserted, also caused many assembly difficulties during the mounting of the brakes.

Furthermore, in the types of magnet bodies known already, the demands for high electric safety can only be met by additional expenses.

The closed annular structure of the magnet body likewise made a special opening and special seals or insulations necessary for introduction of the cable.

The problem to be solved by the invention is to find a magnet body construction in which the above disadvantages can be avoided or reduced without impairing the operation, and the production cost can be definitely lowered by means of manufacturing processes favorable to mass production.

The solution of this problem is obtained by the fact that the conventional closed annular shape of the pole surfaces and reflux cross sections coordinated with the armature plate has been abandoned, but still preserving the annular size and changing the direction of individual cross sections arranged more favorably for production so it can finally again have the total magnetic cross section required.

Hereby it is possible, with stamping or cutting tools, to obtain the iron parts from sheet metal or flat material with only minimal production working surfaces, instead of expensive molding box parts for casting or pressing processes.

A very precise production has further become possible, including prior assembly expenses for instance, by the double use of the plastic shell as a support for the individual parts of the side legs. Those parts can here be attached both during the production of the winding and at the final assembly.

The safe inclusion of the spacer pieces in the plastic shell makes the production and the assembly easier.

Besides, the danger of damages to the winding in the final assembly is practically eliminated and the electric safety is in general considerably improved.

Thus, the cable no longer has to be radially brought out through a bore in the ring of the magnet body and does not require any special protection any more, since it is now in an axial free space between two separate adjacent parts of the side legs, which for their part can radially abut from the outside on the plastic shell and be supported by it.

Further advantages are obtained.

At only the final assembly does the annular disk, provided as the rear for the magnet body, need to be assembled with the winding.

The elements used for the circular arrangement of the individual parts of the side legs likewise can be taken over from pieces of flat material requiring only very little processing.

The individual parts that already compose the magnet body according to the invention can be firmly brought together with the winding when it is encased and thereby protect it.

No separate fixing device for the winding has to be provided any more in the U cross section of the magnet body and the plastic shell carries out a double function by saving work and material.

Expenses for separate tools and preparation or supply are saved.

No loosely supplied spacer pieces or sleeves have to be mounted, and axial openings in the plastic shell can also take over the latter problems of guiding when using several pressure springs distributed on the periphery.

A type of spring arrangement of very reasonable cost and easy to assembly is obtained.

The invention is illustrated in detail in the drawings that follow with reference to an example.

Figure 1:
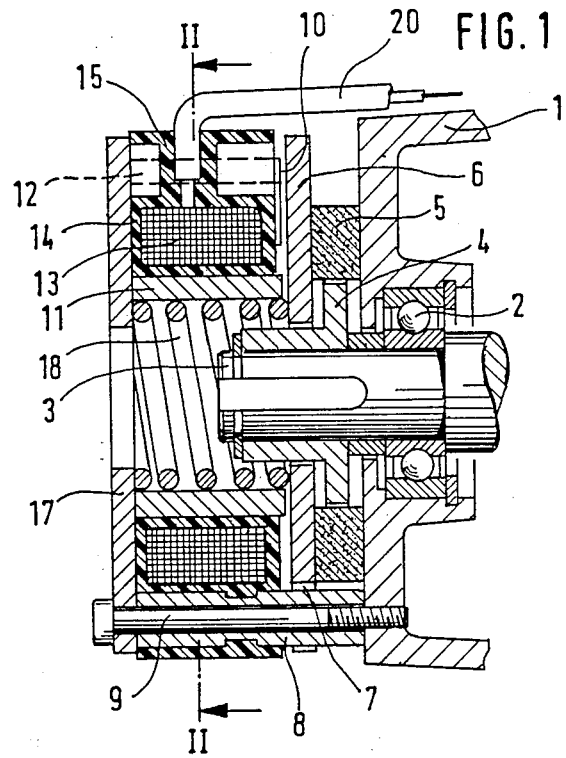
FIG. 1 shows a longitudinal section of an engine brake with a built-in magnet body.
Figure 2:
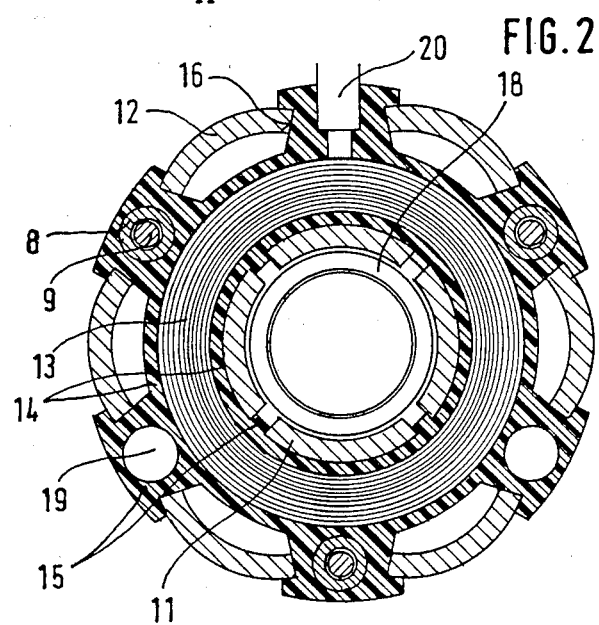
FIG. 2 shows a cross section, along line II—II, of FIG. 1.

In FIG. 1 the brake disk composed of brake hub flange 4 and in the currentless state friction bodies 5 abuts on the end side of the engine flange 1, which comprises a shaft bearing 2 for the shaft 3 at the brake side. The armature disk 6 remote from the engine, situated on the side of the friction bodies 5, is loosely radially guided, in the example, by both the shaft end 3 projecting from the shaft bearing 2 and by the spacer sleeves 8, or fixing bolts 9, that pass through recesses or bores 7 on its outer edge, and which also prevent it from rotating. In the case of an extremely short shaft end 3, the armature disk 6 also could be sufficiently guided by only the sleeves 8. In the axial direction, the armature disk 6 has on each one of its end surfaces an air gap 10 opposite the end surfaces of side leg portions 11, 12 of magnetizable material, which are secured coaxially with the shaft end 3 along the outer and inner periphery of the winding 13 or the plastic shell 14 that surround it.

The side leg portions 11, 12, consisting for instance of cast or sheet metal pieces, are spaced apart in the peripheral direction and in the spaces provided can grip into projections 15 of the plastic shell 14, which can have additional retaining grooves for radially holding of the side leg portions 11, 12. Here the bending radii of the individual portions 11, 12 need not be indispensably related to the center of the whole magnet body itself.

In the axial direction, the side leg portions 11, 12, between the armature disk 6 on one side and an annular disk of preferably equal dimension which form the rear 17 of the U cross section of the magnet body consisting here of the individual side leg portions 11, 12, are locked and simultaneously held in place against the end side remote from the engine of the inner and outer side leg portions 11, 12 for the purpose of good passage of the magnet current. In the free space remaining inside the inner side leg portions 11, between the rear 17 and the armature disk 6, pressure spring (s) 18 is/are inserted with initial stress which, only when current passes through the winding 13, as consequence of the attraction force originating therefrom of the magnet body 11, 12, 13, 17, can be pressed together overcoming the air gap 10 by the armature 6 that removes itself from the friction bodies 5.

The current for the winding 13 is supplied via the cable 20 in one of its projections 15 being embedded in the plastic shell 14 hereby favorably protected against damages. Likewise, of course in the axial direction, the space sleeves 8 or fixing bolts 9 are embedded and housed in the plastic shell 14 in the spoke-like area of the spaces or projections 15 that are present. Since they are of the same diameter as the outer side leg portions 11, 12, building space is spared by the adequately enlarged outer dimensions of the magnet body. In addition, separate pressure springs 18 of the same diameter as the spacer sleeves can be accommodated in the axial bores of the plastic shell 14, in the area of the recesses 15, and thus the inner free space of the magnet body can also be reduced or used for other purposes. Therefore, according to this mode of construction, a separate assembly for winding 13 and spacer sleeve 8 is not needed any more, and the armature disk 6 and rear 17 can be identically designed. Since the operation of a magnet body 11, 12, 13, 17 according to the invention is possible by adequate enlargement of the magnetically acting partial cross sections with a capacity comparable to that of conventional magnet bodies, without enlarging the diameter of bolts or sleeves and eventual springs, by making use of the spaces provided between the side leg portions 11, 12, the advantages represented by the invention with regard to saving materials and expenses benefit both the manufacturers and the users.

Reference numerals
1 engine flange
2 shaft bearing
3 shaft end
4 brake flange
5 friction body
6 armature disk
7 recesses in 6
8 spacer sleeves
9 fixing bolts
10 air gap
11 side leg portions inside
12 side leg portions outside
13 winding
14 plastic shell
15 projections
16 retaining grooves
17 rear of the magnet body
18 pressure spring(s)
19 alternative pressure spring pockets
20 cable

We claim:

1. A magnet body (11, 12, 13, 17) for engine brakes which is secured to an engine flange (1) by means of bolts (9) that non-rotationally hold an axially movable armature disk (6) through which projects a shaft end (3) on which is held a brake flange (4) with friction bodies (5), wherein said magnet body (11, 12, 13, 17), having an iron U cross section toward said armature disk (6) contains a winding (13) excitable by means of direct current and surrounded by a plastic shell (14), characterized in that said U cross section of said magnet body (11, 12, 13, 17) consists of circularly arranged individual cross sections and is formed by several side leg portions (11, 12, 17) held spaced apart by spoke-like arranged spaces, and which consist of iron molded parts fixed in place with respect to each other and to said winding (13) by said plastic shell (14) that fills the spaces.

2. A magnet body according to claim 1, characterized in that the rear (17) of said magnet body (11, 12, 13, 17) is formed by an annular disk placed by means of the bolts (9) on the end side against said plastic shell (14) and against the axially oriented inner and outer side leg portions (11, 12) of said magnet body (11, 12, 13, 17) by means of bolts (9).

3. A magnet body according to claim 1, characterized in that said leg portions (11, 12) of said magnet body are sheet metal bent parts segmentally situated around said winding (13).

4. A magnet body according to claim 3, characterized in that said sheet metal bent parts for inner and outer side leg portions (11, 12) have the same dimensions.

5. A magnet body according to claim 1, characterized in that at least said side leg portions (11, 12) and said winding (13) are extruded together with said plastic shell (14).

6. A magnet body according to claim 1, characterized in that said plastic shell (14) of said winding (13) is at the same time both a supporting part of said side leg portions (11, 12) of said magnet body (11, 12, 13, 17) and an insulating sleeve for said winding (13).

7. A magnet body according to claim 1, characterized in that said rear (17) of said magnet body (11, 12, 13, 17) has substantially the same material properties and dimensions as said armature disk (6).

8. A magnet body according to claim 1, characterized in that axial helical sleeves or spacer pieces (8) or spring pockets are fixedly embedded in said plastic shell (14).

9. A magnet body according to claim 1, characterized in that there is provided only a single pressure spring (18), which is shaped as spiral spring and is axially supported with initial stress in the radial clearance between said inner side legs (11) and said shaft end (3) against inwardly projecting bore edges of said armature disk (6) and the annular disk that forms said rear (17) of said magnet body.

* * * * *